United States Patent
Peng et al.

(10) Patent No.: US 10,483,588 B2
(45) Date of Patent: Nov. 19, 2019

(54) GEL ELECTROLYTE MEMBRANE AND METHOD FOR FORMING THE SAME, ELECTRODE ASSEMBLY, GEL POLYMER LITHIUM-ION BATTERY AND ELECTRIC VEHICLE

(71) Applicants: Xiaoli Peng, SiChuan (CN); Yong Xiang, SiChuan (CN); Chengxu Mou, SiChuan (CN); Li Xia, SiChuan (CN); Wanjin Pu, SiChuan (CN); Jinwei He, SiChuan (CN)

(72) Inventors: Xiaoli Peng, SiChuan (CN); Yong Xiang, SiChuan (CN); Chengxu Mou, SiChuan (CN); Li Xia, SiChuan (CN); Wanjin Pu, SiChuan (CN); Jinwei He, SiChuan (CN)

(73) Assignee: Interstellar Solid-State Li-ion Batteries Technology (Chengdu) Co., Ltd., Chengdu (CN)

( * ) Notice: Subject to any disclaimer, the term of this patent is extended or adjusted under 35 U.S.C. 154(b) by 412 days.

(21) Appl. No.: 15/394,849

(22) Filed: Dec. 30, 2016

(65) Prior Publication Data

US 2017/0288266 A1  Oct. 5, 2017

(30) Foreign Application Priority Data

Mar. 31, 2016 (CN) .......................... 2016 1 0203416

(51) Int. Cl.
*H01M 6/14* (2006.01)
*H01M 10/0565* (2010.01)
*H01M 10/0525* (2010.01)

(52) U.S. Cl.
CPC ... *H01M 10/0565* (2013.01); *H01M 10/0525* (2013.01); *H01M 2220/20* (2013.01); *H01M 2300/0085* (2013.01)

(58) Field of Classification Search
CPC ......... H01M 10/0565; H01M 10/0525; H01M 2220/20; H01M 2300/0085
See application file for complete search history.

(56) References Cited

U.S. PATENT DOCUMENTS

| | | | | |
|---|---|---|---|---|
| 6,902,848 B1 * | 6/2005 | Izuchi | ................ | H01M 10/052 429/231.95 |
| 10,033,033 B2 * | 7/2018 | Ohara | ................... | H01M 4/131 |

FOREIGN PATENT DOCUMENTS

| | | | |
|---|---|---|---|
| CN | 1467870 A | | 1/2004 |
| CN | 102208680 A | | 10/2011 |
| CN | 105006592 A | * | 10/2015 |

OTHER PUBLICATIONS

Translation of CN105006592 (Year: 2015).*

* cited by examiner

*Primary Examiner* — Jane J Rhee
(74) *Attorney, Agent, or Firm* — Minder Law Group; Willy H. Wong (57) ABSTRACT

The present disclosure provides a gel electrolyte membrane and a method for forming the same, an electrode assembly, a gel polymer lithium-ion battery and an electric vehicle. The gel electrolyte membrane is located between the cathode and the anode, and has adhesion of solid electrolyte and electrical conductivity of ion of liquid electrolyte. The gel electrolyte membrane obtained in the present disclosure has a porous mesh structure, a wide film forming temperature, a short required time, a high level of liquid electrolyte in the gel polymer, a high conductivity of 3.4 to 6.3*10$^{-3}$ S·cm$^{-1}$, a wide electrochemical window, a good compatibility with the cathode and the anode, and low requirements for the conditions of the synthesis. The gel polymer lithium-ion battery and electrode assembly and electric vehicle of the present disclosure has high safety, simple forming technique and low requirements for environment, thus is suitable for industrial production.

8 Claims, 3 Drawing Sheets

GEL ELECTROLYTE MEMBRANE AND METHOD FOR FORMING THE SAME, ELECTRODE ASSEMBLY, GEL POLYMER LITHIUM-ION BATTERY AND ELECTRIC VEHICLE

BACKGROUND OF THE INVENTION

Field of Invention

The present disclosure relates to technologies of lithium-ion batteries, and particularly, to a gel electrolyte membrane and a method for forming the same, an electrode assembly, a gel polymer lithium-ion battery and an electric vehicle.

Related Art

Due to advantages such as high energy density, high working voltage, high cycle stability, and small self-discharging effect, lithium-ion batteries become the electric energy storage solution most commonly used in consumer electronic products, electric transportation tools, and clean energy storage systems. Traditional lithium-ion batteries are the main reason for causing safety problems due to having hidden dangers such as flammability and easy leakage of organic electrolytic solution. Compared with the battery having liquid electrolyte, since no free liquid is included in the gel polymer battery, the hidden danger of liquid leakage is eliminated, the performance of impact resistance, vibration, and deformation of the battery are improved, and meanwhile the risks of ignition and explosion in cases of overcharge and over discharge, short circuit, and acupuncture are greatly reduced, which greatly improves the safety of the lithium-ion battery. In addition, since the gel polymer lithium-ion battery can be easily formed into various shapes of films, batteries which are ultra-thin and of various shapes can be formed to adapt to miniaturized, thin, and light electronic products.

A gel polymer is generally formed by a chemical crosslinking method or a physical crosslinking method. For example, a disclosed thermal polymerization method for obtaining a gel electrolyte battery by adding a thermal initiator, a crosslinking agent and the like so that an organic monomer containing a liquid electrolyte is thermally polymerized inside a battery at a certain pressure and a certain temperature. In the thermal polymerization process, thermal expansion and thermal bulge may occur, thereby affecting the performance of the battery. In addition, the thermal polymerization is usually incomplete, and the residual monomer will affect the electrochemical properties of the entire battery. Another disclosed method for obtaining a gel electrolyte battery at a room temperature usually requires 48 to 120 hours by adjusting the ratio of the gelling agent in the gel polymer electrolyte. Although the gel electrolyte battery formed at room temperature can reduce some cost to a certain extent, the gelatinization cycle of the electrolyte is time-consuming, which is unfavorable to industrial production of the battery.

Therefore, it is urgent to research the gel polymer lithium-ion battery and the method for forming the same which can be applied to industrial production and obtain better electrochemical performance of the battery.

SUMMARY OF THE INVENTION

Accordingly, one object of the present disclosure is to provide a method for forming a gel electrolyte membrane, which includes the following steps:

providing a cathode or an anode;
forming a gel electrolyte precursor; and
forming the gel electrolyte membrane on at least one surface of the cathode and/or anode through growing in situ by the gel electrolyte precursor. The gel electrolyte precursor includes a liquid mixture A and a liquid mixture B, the liquid mixture A including a polymer matrix and an organic solvent, and the liquid mixture B including a lithium salt, a plasticizer, and an additive.

Another object of the present disclosure is to provide a gel electrolyte membrane, which has a porous mesh structure. The gel electrolyte membrane is formed on at least one surface of a cathode and/or an anode through growing in situ by a gel electrolyte precursor. The gel electrolyte precursor includes a liquid mixture A and a liquid mixture B. The liquid mixture A includes a polymer matrix and an organic solvent, and the liquid mixture B includes a lithium salt, a plasticizer, and an additive.

A further object of the present disclosure is to provide a method for forming a gel polymer lithium-ion battery, which includes the following steps:

providing a cathode or an anode;
forming a gel electrolyte precursor;
forming a gel electrolyte membrane on the at least one surface of the cathode and/or the anode through growing in situ by the gel electrolyte precursor;
laminating the processed cathode and the processed anode to form a bare cell of the gel polymer lithium-ion battery with the gel electrolyte membrane sandwiched between the cathode and the anode; and forming the gel polymer lithium-ion battery by the bare cell. The gel electrolyte precursor includes a liquid mixture A and a liquid mixture B. The liquid mixture A includes a polymer matrix and an organic solvent, and the liquid mixture B includes a lithium salt, a plasticizer, and an additive.

Still a further object of the present disclosure is to provide a gel polymer lithium battery, which includes a cathode, an anode, and a gel electrolyte membrane formed on at least one surface of the cathode and/or the anode through growing in situ by a gel electrolyte precursor.

The gel electrolyte precursor includes a liquid mixture A and a liquid mixture B. The liquid mixture A includes a polymer matrix and an organic solvent, and the liquid mixture B includes a lithium salt, a plasticizer, and an additive.

Yet another further object of the present disclosure is to provide an electric vehicle including the above gel electrolyte membrane.

Yet another further object of the present disclosure is to provide an electrode assembly including a cathode or an anode with a gel electrolyte membrane formed on at least one surface of the cathode and/or anode through growing in situ by a gel electrolyte precursor.

Other objects, advantages and novel features of the disclosure will become more apparent from the following detail description when taken in conjunction with the accompanying drawings.

BRIEF DESCRIPTION OF THE DRAWINGS

The present disclosure will be described in more detail with reference to the accompany drawings and the embodiments, wherein in the drawings.

DETAILED DESCRIPTION OF THE INVENTION

For clearly understanding technical features, purpose, and effect of the present disclosure, embodiments are given in detail hereinafter with reference to the accompanying drawings.

The present disclosure provides a method for forming a gel electrolyte membrane, including the following steps:
step S1, providing a cathode and/or an anode;
step S2, forming a gel electrolyte precursor; and
step S3, forming a gel electrolyte membrane on at least one surface of the cathode and/or anode through growing in situ by the gel electrolyte precursor.

The order between the above steps of step S1 and the step S2 is only illustrative and is not intended to specifically limit the method, for example, the cathode and/or the anode can be provided at the same time as the gel electrolyte precursor is formed, or, the cathode and/or the anode can be provided after the gel electrolyte precursor is formed.

The gel electrolyte precursor includes the following components by mass fraction:
polymer matrix: 1 to 60%;
organic solvent: 20 to 90%;
lithium salt: 1 to 50%;
plasticizer: 1 to 60%; and
additives: 1 to 50%.

In Step S2, forming the gel electrolyte precursor includes the following steps.

Step R1, preparing a liquid mixture A including the following steps:
providing polymer matrix in mass fraction of: 1 to 60% and organic solvent in mass fraction of: 20 to 90%; and
mixing the above two components and stirring for 0.5 to 96 hours at a speed of 100 to 5000 rpm and at a temperature of −10 to 30° C. until the liquid mixture A is dissolved and homogenously dispersed.

Step R2, preparing a liquid mixture B including the following steps:
providing lithium salt in mass fraction of: 1 to 50%; plasticizer in mass fraction of: 1 to 60%; and additives in mass fraction of: 1 to 50%; and
mixing the above components and stirring at a speed of 100 to 5000 rpm and at a temperature of −10 to 30° C. for 0.5 to 96 hours until the liquid mixture B is dissolved and homogenously dispersed.

Step R3, mixing the liquid mixture A and the liquid mixture B and stirring the mixture of the liquid mixture A and the liquid mixture B at a speed of 100 to 5000 rpm and at a temperature of −10 to 30° C. for 0.5 to 96 hours until the mixture is homogenously dispersed to form the gel electrolyte precursor solution.

In the above step R1, the liquid mixture A further includes 0 to 20% antioxidant by mass fraction.

In the above step R2, the additives in the liquid mixture B further includes inorganic nanoparticles, a flame retardant, a film former, an anti-overcharge additive, a surfactant, and a phase separation solution. The proportions of the above components of the additives by mass fraction are as follows:
inorganic nanoparticles: 0 to 40%;
flame retardant: 0 to 20%;
film former: 0 to 20%;
anti-overcharge additive: 1 to 10%;
surfactant: 0 to 50%; and
phase separation solution: 0 to 50%.

In some embodiments of the present disclosure, the gel electrolyte precursor can includes the following components by special mass fraction as follows:
polymer matrix: 1 to 60%;
organic solvent: 20 to 90%;
lithium salt: 1 to 50%;
plasticizer: 1 to 60%;
inorganic nanoparticles: 0 to 40%;
flame retardant: 0 to 20%;
film former: 0 to 20%;
anti-overcharge additive: 0 to 10%;
surfactant: 0 to 50%;
phase separation solution: 0 to 50%; and
antioxidant: 0 to 20%.

In some embodiments, in the steps R2 and R3, the above components can be stirred at the following speed: 100 to 500 rpm, 200 to 480 rpm, 350 to 800 rpm, 100 to 3500 rpm, 1500 to 4000 rpm, 1800 to 3800 rpm, 2100 to 3400 rpm, 1500 to 4000 rpm, 2000 to 3600 rpm, 2400 to 2800 rpm or 4100 to 5000 rpm. The specific stirring speed can be: 100 rpm, 250 rpm, 500 rpm, 700 rpm, 850 rpm, 900 rpm, 960 rpm, 1050 rpm, 1100 rpm, 1200 rpm, 1450 rpm, 1650 rpm, 1700 rpm, 1860 rpm, 1950 rpm, 2000 rpm, 2150 rpm, 2250 rpm, 2450 rpm, 2560 rpm, 2840 rpm, 2970 rpm, 3000 rpm, 3200 rpm, 3550 rpm, 3750 rpm, 3950 rpm, 4050 rpm, 4250 rpm, 4550 rpm, 4600 rpm, 4850 rpm, or 5000 rpm.

In some preferred embodiments, in the steps R2 and R3, the above components can be mixed and stirred at the following temperature: −10 to 0° C., −5 to 0° C., −1 to 3° C., 1 to 10° C., 10 to 15° C., 15 to 25° C., 25 to 30° C., 25 to 30° C., or 25 to 28° C. The specific temperature can be: −10° C., −7° C., −3° C., 0° C., 4° C., 7° C., 10° C., 13° C., 15° C., 21° C., 25° C., 28° C., or 30° C.

In some embodiments, in the steps R2 and R3, the above components can be mixed and stirred for the following time: 0.5 to 94 h, 1 to 90 h, 5 to 84 h, 10 to 72 h, 24 to 72 h, 24 to 60 h, 24 to 48 h, 24 to 36 h, 24 to 30 h, 0.5 to 4 h, 0.5 to 4.5 h, 1 to 8 h, 0.5 to 0.7 h, 1.5 to 4.5 h or 4.5 to 8.5 h. The specific stirring time can be: 0.5 h, 1 h, 2.5 h, 4.5 h, 5 h, 7.5 h, 8 h, 9.5 h, 11.5 h, 13.5 h, 16.5 h, 18.5 h, 20.5 h, 24 h, 36.5 h, 45.3 h, 48 h, 69.5 h, 72 h, 78.5 h, 84 h, 88.5 h, 94.5 h, or 96 h.

In the embodiment, the cathode can be made from one or a mixture of several materials selected from but not limited to the following groups: lithium cobalt oxide, lithium manganese phosphate, lithium iron phosphate, nickel cobalt manganese ternary cathode material, and nickel cobalt aluminum ternary cathode material, etc. The anode may be made from one or a mixture of several materials selected from but not limited to the following groups: a carbon-based anode material, a lithium titanate, an alloy-based anode material, and a transition metal oxide anode material, etc.

The polymer matrix can be one or a mixture of two or more materials selected from but not limited to the following groups: polyvinyl chloride (PVC), chlorinated polyvinyl chloride (CPVC), polystyrene (PS), polyethylene oxide (PEO), polymethylmethacrylate (PMMA), polyvinylidene fluoride (PVDF), polyacrylonitrile (PAN), vinylidene fluoride-hexafluoropropylene copolymer (PVDF-HFP), polyethylene (PE), methyl methacrylate (MMA), thermoplastic acrylic resin (B72, B44), etc. In some preferred embodiments, the mass ratio of the polymer matrix to the gel electrolyte precursor is: 1 to 21%, 21 to 39%, 39 to 53%, 53 to 60%, 1 to 11%, 5 to 13%, 13 to 25%, or 33 to 59%, etc. In some more preferred embodiments, the mass ratio of the polymer matrix to the gel electrolyte precursor can be: 1%, 3%, 5%, 7%, 8.6%, 9%, 9.3%, 10%, 10.1%, 13%, 14%, 16%, 18%, 20%, 21%, 25%, 27%, 30%, 32%, 34%, 35%, 37%, 40%, 42%, 45%, 47%, 50%, 53%, 57%, 59%, or 60%.

The organic solvent can be one or more material selected from but not limited to the following groups: acetone, N-methylpyrrolidone (NMP), anhydrous ethanol, dimethyl sulfoxide (DMSO), dimethylformamide (DMF), tetrahydrofuran (THF), and ethyl acetate, etc. The mass ratio of the organic solvent to the gel electrolyte precursor is: 21 to 89%, 23 to 87%, 27 to 83%, 31 to 76%, 31 to 57%, 23 to 57%, 44 to 67%, 45 to 71%, 47 to 59%, 71 to 90%, 75.1 to 86.3%, or 78.2 to 85.2%, etc. In some more preferred embodiments, the specific mass ratio of the organic solvent to the gel electrolyte precursor can be: 20%, 21%, 27%, 32%, 35%, 39%, 41%, 43%, 46%, 47%, 49%, 51%, 53%, 54%, 56%, 57%, 69%, 55%, 57%, 63%, 65%, 67.6%, 70.2%, 74%, 78%, 81%, 83%, 85.2%, 85.6%, 87%, or 90%.

The lithium salt can be one or more material selected from but not limited to the following groups: lithium hexafluorophosphate (LiPF6), lithium perchlorate (LiClO4), lithium hexafluoroarsenate (LiAsF6), lithium tetrafluoroborate (LiBF4), lithium tetrachloroaluminate, lithium bistrifluoromethanesulfonyl imide (LiN(CF3SO2)2), lithium trifluoromethanesulfonate (LiCF3SO3), lithium dihydrogen oxalate (LiB(C2O4)2), lithium chlorinated tetrafluoroborate (LiBF3Cl), lithium difluoroborate oxalate (LiODFB), lithium perfluoromethanesulfonate (LiCF3SO3), lithium fluoride (LiF), lithium carbonate (LiCO3), and lithium chloride (LiCl), etc. The mass ratio of the lithium salt to the gel electrolyte precursor is: 1 to 47%, 2 to 45%, 4.5 to 42.5%, 7.6 to 41%, 8 to 39%, 11 to 37%, 15.1 to 36.7%, 39 to 41%, or 45 to 50%, etc. In some more preferred embodiments, the mass ratio of the lithium salt to gel electrolyte precursor can be: 1%, 2.6%, 4.7%, 5.1%, 5.6%, 7%, 11.5%, 13.3%, 15.7%, 16.8%, 17.6%, 19.8%, 21.5%, 23.4%, 25.3%, 26.8%, 29.3%, 30.5%, 32.4%, 34.1%, 35%, 40%, 41.2%, 43.2%, 45.7%, 46.8%, 47.3%, 49.7%, or 50%. In some preferred embodiments, the concentration of the lithium salt in the gel electrolyte precursor preferably ranges from 0.1 to 3 mol/L. In some more preferred embodiments, the further concentration of the lithium salt in the gel electrolyte precursor is: 0.5 to 2.1 mol/L, 0.7 to 1.5 mol/L, 1.0 to 2.5 mol/L, 2.1 to 35 mol/L, or 1.8 to 2.5 mol/L, etc. The specific concentration of the lithium salt in the gel electrolyte precursor can be: 0.1 mol/L, 0.25 mol/L, 0.3 mol/L, 0.46 mol/L, 0.58 mol/L, 0.7 mol/L, 0.85 mol/L, 0.91 mol/L, 1.3 mol/L, 1.5 mol/L, 1.7 mol/L, 1.85 mol/L, 2.0 mol/L, 2.3 mol/L, or 3 mol/L, etc.

The plasticizer may be one or more material selected from but not limited to the following groups: propylene carbonate (PC), ethylene carbonate (EC), 1, 4-butyrolactone (γ-BL), diethyl carbonate (DEC), carbonic acid dimethyl carbonate (DMC), methyl ethyl carbonate (EMC), methyl propyl carbonate (EMP), and ethyl acetate (EA), etc. The mass ratio of the plasticizer to the gel electrolyte precursor is: 1 to 53%, 9 to 48%, 4.9 to 16.5%, 8.7 to 12.3%, 10.6 to 21%, 18 to 26.4%, 16 to 38.5%, 13 to 36.5%, 36.5 to 41.2%, 20.6 to 41.1%, 41 to 57%, or 53.5 to 60%, etc. In some more preferred embodiments, the mass ratio of the plasticizer to the gel electrolyte precursor can be: 1%, 2.6%, 4.5%, 5.4%, 5.8%, 6.3%, 7.4%, 8.7%, 9.5%, 9.96%, 10.0%, 10.6%, 10.8%, 11.4%, 11.7%, 12.8%, 13.6%, 14.9%, 15.2%, 16.7%, 17.8%, 19.7%, 20.8%, 21.2%, 22.5%, 26.5%, 29.6%, 30.9%, 33.5%, 35.6%, 36.7%, 37.7%, 39.6%, 41.3%, 42.5%, 43.4%, 44.5%, 47.6%, 49.9%, 52.3%, 56%, 57.3%, 58.7%, or 60%. In some preferred embodiments, the plasticizer is the main solvent of the electrolytic solution.

The inorganic material nanoparticles may be one or more material selected from but not limited to the following groups: nano-silica (SiO2), titanium dioxide (TiO2), aluminum oxide (Al2O3), lithium metaaluminate (LiAlO2), zeolite, lithium nitride (Li3N), and barium titanate (BaTiO3), etc. The mass ratio of the inorganic material nanoparticles to the gel electrolyte precursor is: 0.001 to 39%, 2 to 37%, 4.5 to 34.5%, 1.2 to 12.5%, 12.5 to 14.5%, 15 to 23.1%, 23.5 to 35.2%, 29.1 to 34%, or 34 to 40%, etc. In some more preferred embodiments, the mass ratio of the inorganic material nanoparticles to the gel electrolyte precursor can be: 0.001%, 0.008%, 0.013%, 0.015%, 0.021%, 0.032%, 0.045%, 0.0985%, 0.25%, 0.56%, 0.78%, 0.93%, 1%, 2.3%, 3.4%, 5%, 5.6%, 5.8%, 8.1%, 8.9%, 9.1%, 9.6%, 10.2%, 10.4%, 10.5%, 15.6%, 17.5%, 18.3%, 19.3%, 20.6%, 23.8%, 25.7%, 28.8%, 29.1%, 32.1%, 33.4%, 35.6%, 37.4%, 38.3%, 39.1%, 39.6%, or 40%.

The flame retardant may be one or more material selected from but not limited to the following groups: trimethyl phosphate (TMP), triethyl phosphate (TEP), triphenyl phosphate (TPP) and tributyl phosphate (TBP), monofluoromethyl ethylene carbonate (CH2F-EC), difluoromethyl vinyl carbonate (CHF2-EC), and vinyl trifluoro methyl carbonate (CF3-EC), etc. In some preferred embodiments, the type and mass of the flame retardant may be added according to the requirements of the designed battery. The mass ratio of the flame retardant to the gel electrolyte precursor is: 0.001 to 19.8%, 2.6 to 19%, 3.1 to 18.7%, 3.7 to 17.6%, 4.5 to 15.6%, 5.6 to 14.3%, 1 to 5.6%, 5.6 to 12.4%, 12.5 to 18.4%, 18.4 to 19.6%, or 15.3 to 20%, etc. In some more preferred embodiments, the mass ratio of the flame retardant to the gel electrolyte precursor can be: 0.001%, 0.007%, 0.016%, 0.023%, 0.031%, 0.041%, 0.065%, 0.0985%, 0.21%, 0.49%, 0.85%, 1.0%, 4.3%, 5.6%, 5.9%, 6%, 7%, 8.9%, 9.1%, 9.7%, 10.1%, 10.4%, 11.5%, 12.6%, 12.9%, 13.1%, 13.6%, 14%, 15%, 15.6%, 15.7%, 16.1%, 16.5%, 16.8%, 17.2%, 17.6%, 18.9%, 19.2%, 19.7%, or 20%.

The film former may be one or a mixture of several materials selected from but not limited to the following materials:

a) gas film formers: sulfur dioxide (SO2), carbon dioxide (CO2), carbon monoxide (CO), and carbon disulfide (CS2), etc.;

b) liquid film formers: sulfurous acid esters (ES, PS, DMS, DES), anisole, vinylene carbonate (VC), tetrachlorethylene (TCE), acrylonitrile, vinyl acetate (VA), ethylenedioxythiophene, biphenyl, o-terphenyl, m-terphenyl, fluoroethylene carbonate, and DMSM, etc;

c) solid film formers: lithium carbonate (Li2CO3), lithium oxide (Li2O), sodium perchlorate (NaClO4), potassium carbonate (K2CO3), silver hexafluorophosphate (AgPF6), copper trifluoromethanesulfonate (CuTF), calcium trifluoromethanesulfonate Ca(TFSA)2, sodium chloride (NaCl), lithium trimethylsilane borate, and lithium silicate (Li2SiO3), etc. The mass ratio of the film former to the gel electrolyte precursor is: 0.001 to 19.7%, 2.5 to 19.1%, 3.1 to 17.7%, 4.1 to 16.9%, 4.5 to 15.6%, 5 to 14.5%, 6 to 12.6%, 6.6 to 11.9%, 12.3 to 15.5%, 15.4 to 17.6%, or 17.3 to 20%, etc. In some more preferred embodiments, the mass ratio of the film former to the gel electrolyte precursor can be: 0.001%, 0.007%, 0.016%, 0.023%, 0.031%, 0.041%, 0.065%, 0.0985%, 0.21%, 0.49%, 0.85%, 1.0%, 4.2%, 5.0%, 5.4%, 6.3%, 7.2%, 8.3%, 9.1%, 9.3%, 10.1%, 10.1%, 11.4%, 11.5%, 12.5%, 12.8%, 13.2%, 13.4%, 14.1%, 15.3%, 15.7%, 15.9%, 16.1%, 16.4%, 16.7%, 17.3%, 17.7%, 18.7%, 19.1%, 19.7%, or 20%.

The anti-overcharge additive may be one or a mixture of several selected from but not limited to the following materials:

a) alkyl connected to aromatic ring, such as cyclohexyl benzene, cumene, tert-butyl benzene, and tert-pentyl benzene, etc;

b) aromatic ring containing halogen, such as fluorobenzene, difluorobenzene, trifluorobenzene, and chlorobenzene, etc;

c) aromatic ring with alkoxy, such as anisole, fluoroanisole, dimethoxybenzene, and diethoxy benzene, etc;

d) aromatic carboxylic acid esters, such as dibutyl phthalate;

e) carboxylic acid ester containing benzene ring, such as tolyl carbonate and diphenyl carbonate; and f) ferrocene, biphenyl, 3-chloromethoxybenzene and cyclohexylbenzene.

The mass ratio of the anti-overcharge additive to the gel electrolyte precursor is: 0.001 to 10%, 1.2 to 9.6%, 1.5 to 9.5%, 1.5 to 8.5%, 1.6 to 7.6%, 2.6 to 6.8%, 6.9 to 9.8%, 7.8 to 9.6%, 8.2 to 9.2%, 5 to 8%, or 9.1 to 9.9%, etc. In some more preferred embodiments, the mass ratio of the anti-overcharge additive to the gel electrolyte precursor can be: 0.001%, 0.007%, 0.016%, 0.023%, 0.031%, 0.041%, 0.065%, 0.0985%, 0.21%, 0.49%, 0.85%, 1.0%, 2.3%, 2.6%, 2.7%, 3%, 3.2%, 3.9%, 4.1%, 4.7%, 5.1%, 5.4%, 5.9%, 6.6%, 6.9%, 7.1%, 7.6%, 7.9%, 8%, 8.6%, 8.7%, 9.1%, 9.5%, 9.8%, 9.9%, or 10%.

The surfactant can be one or more materials selected from but not limited to the following groups: fluorosurfactant (FS-3100), wetting agent (Dynol 607), wetting agent (Dynol 980), wetting agent (EnviroGem360), carboxymethyl cellulose sodium salt (CMC-Na), sulfuric acid ester salts (such as acrylonitrile-EPDM rubber-styrene copolymer (AES) surfactants, sodium sulfate, fatty alcohol polyoxyethylene ether (AEO-9)), coconut fatty acid diethanolamide, polyether modified polydimethylsiloxane, alkylphenolethoxylates (OP-10), 1-dodecylazepan-2-ketone, and various fluorine-containing surfactants, etc. The mass ratio of the surfactant to the gel electrolyte precursor is: 0.001 to 48%, 3 to 46%, 4.6 to 46.5%, 8.6 to 42.3%, 9.6 to 38.5%, 11 to 36.6%, 12 to 35.8%, 37 to 42.5%, 12 to 20.3%, or 42.5 to 50%. In some more preferred embodiments, the mass ratio of the surfactant to the gel electrolyte precursor can be: 0.001%, 0.007%, 0.016%, 0.023%, 0.031%, 0.041%, 0.065%, 0.0985%, 0.21%, 0.49%, 0.85%, 0.97%, 1%, 2.3%, 4.4%, 5.7%, 5.9%, 6.1%, 7.3%, 8.6%, 9.3%, 10.2%, 11.6%, 12.4%, 13.3%, 14.7%, 15.8%, 16.5%, 17.1%, 17.9%, 18.2%, 18.5%, 20.9%, 23.5%, 26.4%, 29.1%, 30%, 33.5%, 37.6%, 38.9%, 42.2%, 46%, 47.3%, 48.9%, or 50%.

The phase separation solution may be one or more material selected from but not limited to the following groups: ethane, toluene, benzene, tetrachlorethylene, tetrachloroethane, and cyclohexane, etc. The mass ratio of the phase separation solution to the gel electrolyte precursor is: 0.001 to 48.1%, 3 to 46.5%, 5.1 to 44.2%, 8.6 to 42.1%, 10.3 to 37.5%, 11.8 to 35.6%, 12.9 to 34.2%, 18.5 to 32.7%, 35.7 to 42.6%, or 27.8 to 50%, etc. In some more preferred embodiments, the mass ratio of the phase separation solution to the gel electrolyte precursor can be: 0.001%, 0.007%, 0.016%, 0.023%, 0.031%, 0.041%, 0.065%, 0.0985%, 0.21%, 0.49%, 0.85%, 0.97%, 1%, 2.3%, 3.5%, 4.4%, 6.8%, 7.3%, 8.4%, 8.7%, 10.5%, 11.9%, 12.4%, 14.8%, 15.6%, 15.9%, 16.2%, 17.7%, 18.2%, 19.6%, 20.4%, 21.6%, 22.7%, 24.8%, 29.3%, 30.5%, 32.6%, 34.2%, 35.8%, 36.7%, 39.1%, 41.5%, 42.8%, 43.6%, 45.8%, 46.9%, 48.9%.

The antioxidant may be one or a mixture of several selected from but not limited to materials: antioxidant 1010, antioxidant 168, antioxidant 1076, antioxidant B900, antioxidant 3114, antioxidant 1098, antioxidant 245, etc. In some preferred embodiments, the mass ratio of the antioxidant to the gel electrolyte precursor is: 0.001 to 18%, 0.0022 to 15%, 0.01 to 11%, 0.04 to 9%, 0.07 to 8.6%, 0.1 to 3.4%, or 1% to 3%, etc. In some more preferred embodiments, the mass ratio of the antioxidant to the gel electrolyte precursor can be: 0.001%, 0.024%, 0.01%, 0.041%, 0.056%, 0.07%, 0.1%, 0.13%, 0.21%, 0.54%, 0.8%, 1%, 5%, 8.2%, 10.1%, 13.4%, 15.6%, 17.8%, 18.1%, 19.6%, or 20%.

In some preferred embodiments, the process for forming the gel electrolyte membrane may be performed under inert gas-protected conditions or in the presence of dry air.

In some embodiment, the gel electrolyte precursor obtained in step S2 is coated on at least one surface of the cathode and/or the anode, for 1 s to 48 h.

In some embodiments, a thickness of the gel electrolyte membrane formed on the at least one surface of the cathode and/or the anode is in the range of 20 to 100 μm. For example, in some embodiments, the gel electrolyte precursor can be formed on two surfaces of the anode and/or the cathode. Furthermore, when the coating operation is performed at a temperature of −10 to 30° C. under a pressure of −0.9 to 1 Mpa under inert gas-protected condition or in the presence of dry air, the thickness of the gel electrolyte precursor membrane is in the range of 10 to 50 μm which is grown in situ on at least one surface of the cathode and/or the anode. The gel electrolyte membrane has a better adhesion to the surface of the cathode and/or the anode, and the interfacial compatibility between the gel electrolyte membrane and the corresponding surface of the cathode and/or the anode is good.

The thickness of the gel electrolyte membrane grown in situ on at least one surface of the cathode and/or the anode may be adjusted according to the number of times of the coating operation and the duration of the coating time. For example, if more times of the coating operation are performed and the coating time is relatively longer, the thickness of the gel electrolyte membrane obtained by in-situ growth is relatively thicker. The number of times of the coating operation can be determined depending on the required electrochemical property of the obtained gel electrolyte membrane. For example, the coating operation can be performed 1 time, 2 times, 3 times, 4 times, 5 times, which is not limited here.

In still other embodiments, the coating of the gel electrolyte precursor can be performed by immersing the cathode and/or the anode into the gel electrolyte precursor such that the gel electrolyte membrane grows in situ on at least one surface of the cathode and/or the anode.

In some preferred embodiments, the gel electrolyte precursor contains volatile material; during the coating of the gel electrolyte precursor, some of the volatile material (such as an organic solvent) is volatilized, resulting in a phase separation process. During the coating in the above step S3, the gel electrolyte precursor homogenously grows in situ on the surface of the cathode and/or the anode and forms the gel electrolyte membrane with a certain thickness and a porous mesh structure. Due to the porous mesh structure of the surfaces of the cathode and the anode, the surface of the cathode and/or the anode have a good interfacial compatibility with the gel electrolyte membrane growing in situ on the surface, thereby effectively reducing the interfacial resistance of the surface of the cathode and/or the anode and improving the cycle performance of the battery.

The present disclosure further provides a method for forming a gel electrolyte membrane in accordance with a second embodiment. The difference between the method of the first embodiment and that of the second embodiment is that, the method of the second embodiment further includes the following steps before the step S3:

Step P1, forming an activated infiltration solution of the cathode and an activated infiltration solution of the anode by mixing a surfactant, a film former and a plasticizer with a certain ratio.

In some preferred embodiments, according to the different material of the cathode and the anode, different surfactants and different film formers can be selected. In addition, different wetting additives can be selected according to different desired compaction density and the activation standing time. The proportions of the components of the formed activated infiltration solution of the cathode and the anode are as follows:

Surfactant in mass fraction of: 0.001 to 60%;
film former in mass fraction of: 0.001 to 20%; and
plasticizer in mass fraction of: 1 to 90%.

In some preferred embodiments, in the above step P1, the activated infiltration solution can be adjusted according to some specific requirements of the material of the cathode and the anode to form the corresponding activated infiltration solution of the cathode and the anode.

The surfactant, the film former, and the plasticizer in the activated infiltration solution of the cathode and the activated infiltration solution of the anode can be selected from the above surfactant, the film former, and the plasticizer for forming the gel electrolyte precursor, and the type and the ratio of the surfactant, the film former, and the plasticizer can be the same as those of the surfactant, the film former, and the plasticizer in the gel electrolyte precursor, which is not repeated in detail here.

It is to be understood, the order of forming the activated infiltration solution of the cathode and forming the activated infiltration solution of the anode is not limited.

Step P2, infiltrating and activating the cathode and the anode:

after the cathode and the anode been cut and dewatered in a high temperature, immersing the cathode and the anode into the corresponding activated infiltration solution formed in step P1 for 1 s to 2 h.

In some preferred embodiments of the present disclosure, the cathode and the anode can be cut according to the final shape of the formed gel polymer lithium-ion battery.

The concentration of the activated infiltration solution and the infiltration time need to be reasonably set according to the compaction density and the porosity of the cathode and the anode. Such that the activated infiltration solution (e.g., the activated infiltration solution of the cathode and the activated infiltration solution of the anode) can be quickly infiltrated into the material of the cathode and the anode, to achieve the desired degrees of infiltration and activation. In some preferred embodiments, there is no infiltration liquid remain on the surfaces of the cathode and the anode after processed by the above step P2.

In the present disclosure, the infiltration activation operation to the cathode and the anode in the above step P2 can effectively remove active particles, dust and other impurities on the surfaces of the cathode and the anode, and simultaneously improve the interface performance between the cathode or the anode and the gel electrolyte precursor, reduce the interfacial resistance, and improve the cycle and rate performance of the battery.

The present disclosure further provides a gel electrolyte membrane according to a third embodiment of the present disclosure. The gel electrolyte membrane is formed by the methods provided in the first and second embodiments. The gel electrolyte membrane is formed on at least one surface of the cathode and/or the anode by the above described gel electrolyte precursor through growing in situ on the surface of the cathode and/or the anode.

The gel electrolyte membrane has a porous mesh structure, and a pore size of the gel electrolyte membrane ranges from 50 nm to 2 µm. In some preferred embodiments, the thickness of the gel electrolyte membrane may be 10 to 21 µm, 22 to 29 µm, 29 to 37 µm, 37 to 43 µm, or 43 to 50 µm, and may further specifically be: 10 µm, 11.5 µm, 13.2 µm, 14.1 µm, 15.4 µm, 15.7 µm, 16.0 µm, 16.3 µm, 16.7 µm, 17.1 µm, 17.5 µm, 19.3 µm, 21.7 µm, 23.4 µm, 25.9 µm, 27.6 µm, 29.0 µm, 30.1 µm, 31.6 µm, 32.5 µm, 33.8 µm, 34.9 µm, 35.7 µm, 36.1 µm, 36.7 µm, 37.8 µm, 38.4 µm, 39.6 µm, 39.9 µm, 40.1 µm, 41.2 µm, 42.5 µm, 43.6 µm, 44.7 µm, 48.6 µm, 48.9 µm, 49.5 µm, or 50.0 µm.

The residence level of the electrolytic solution in the gel electrolyte membrane is about 40 to 95%. The residence level of the electrolytic solution in the gel electrolyte membrane depends on the thickness of the gel electrolyte membrane and the pore size thereof. The higher the residence level of the electrolytic solution, the better absorption of the electrolytic solution by the gel electrolyte membrane.

The present disclosure provides an electrode assembly in accordance with a fourth embodiment, which includes a cathode or an anode with a gel electrolyte membrane formed on at least one surface of the cathode and/or anode through growing in situ by a gel electrolyte precursor.

The cathode and the anode are the same as those cathode and as described in the first and second embodiments. The gel electrolyte precursor and the gel electrolyte membrane are formed by the above described methods in the first and second embodiments, which is not repeated in detail here.

The present disclosure provides a method for forming a gel polymer lithium-ion battery in accordance with a fifth embodiment, which includes the following steps:

Step T1, forming a gel electrolyte precursor;

Step T2, forming the gel electrolyte membrane on at least one surface of a cathode and/or an anode through growing in situ by the gel electrolyte precursor, thereby forming a bare cell of the gel polymer lithium-ion battery; and Step T3, forming the desired gel polymer lithium-ion battery by the bare cell.

The gel electrolyte precursor includes a liquid mixture A and a liquid mixture B. The liquid mixture A and the liquid mixture B are same as that of the above described in the first and second embodiments. In step T2, the gel electrolyte membrane is formed by coating the gel electrolyte precursor on at least one surface of the cathode and/or the anode and then growing in-situ on the surface of the cathode and/or the anode.

After the gel electrolyte membrane is formed on the at least one surface of the cathode and/or the anode, the cathode and the anode is laminated or wound to assemble together with the gel electrolyte membrane sandwiched therebetween and then be welded tabs to the cathode and the anode to obtain the bare cell of the lithium-ion battery.

In some preferred embodiments, Step T3 further includes packaging the bare cell of the gel polymer lithium-ion battery and then standing, forming, shaping, and degassing of the packed cell to obtain the gel polymer lithium-ion battery. The packaging of the bare cell includes coin cell package, soft cell package, and steel shell package, etc.

The above method for forming the gel polymer lithium-ion battery further includes the following steps before step T2 and after step T1:

step Q1, forming the activated infiltration solution of the cathode and an activated infiltration solution of the anode; and step Q2, infiltrating and activating the cathode and the anode respectively by the activated infiltration solution of the cathode and the activated infiltration solution of the anode for 1 s to 2 h.

The components and the mass fraction of each components of the activated infiltration solution of the cathode and the activated infiltration solution of the anode are the same as those of the activated infiltration solutions described in the first and second embodiments, which is not repeated in detail here.

In some embodiments, the activated infiltration solution of the cathode and the activated infiltration solution of the anode can be formed before step T1.

The present disclosure further provides a gel polymer lithium-ion battery in accordance with a sixth embodiment. The gel polymer lithium-ion battery includes a cathode, an anode, and a gel electrolyte membrane sandwiched between the cathode and the anode. The gel electrolyte membrane is formed on at least one surface of the cathode and/or the anode through growing in situ by a gel electrolyte precursor. The gel electrolyte precursor includes a liquid mixture A and a liquid mixture B, the liquid mixture A includes a polymer matrix and an organic solvent, and the liquid mixture B includes a lithium salt, a plasticizer, and an additive.

In some preferred embodiments, the gel electrolyte membrane grows in situ on at least one surface of the cathode and/or the anode by the gel electrolyte precursor.

The gel electrolyte membrane can be formed on at least one surface of the anode. In some preferred embodiments, the gel electrolyte membrane can be formed on two opposite surfaces of the anode.

In the embodiment, the gel electrolyte membrane is formed by the method of the first and second embodiments, which is not repeated in detail here.

The gel electrolyte membrane of the gel polymer lithium-ion battery has a porous mesh structure and a thickness of 10 to 50 μm. A pore size of the gel electrolyte membrane ranges from 50 nm to 2 μm. The thickness and pore size of the gel electrolyte membrane of the gel polymer lithium-ion battery are the same as those of the gel electrolyte membrane in the third embodiment.

The gel electrolyte precursor is formed by the polymer matrix, antioxidant, organic solvent, lithium salt, inorganic nanoparticles, flame retardant, film former, anti-overcharge additive, surfactant, plasticizer, phase separation solution and antioxidant which are the same as that of the gel electrolyte precursor in the embodiments 1 and 2. The gel polymer lithium-ion battery provided by the present disclosure has higher safety, small interfacial resistance, and good cycle performance.

The present disclosure further provides an electric vehicle in accordance a seventh embodiment. The electric vehicle includes the gel electrolyte membrane of the third embodiment, or the gel electrolyte membrane and the gel polymer lithium-ion battery of the sixth embodiment. The electric vehicle of the present disclosure has features including long life duration, high safety, good battery cycle performance, good interfacial compatibility and small interfacial resistance.

In order to further verify the gel polymer lithium-ion battery and the method for forming the same, the present disclosure further provides Experimental group and comparative group as follows.

Experiment 1

The steps of forming the gel polymer lithium-ion battery are as follows.

Forming the electrolyte precursor and the activated infiltration solution under inert gas-protected condition.

The liquid mixture A and the liquid mixture B formed according to the following component proportions are respectively stirred at a temperature of 25° C. at a rotational speed of 1000 rpm for 12 hours; after the liquid mixture A and the liquid mixture B are respectively well mixed, the liquid mixture A and the liquid mixture B are mixed and stirred at a rotational speed of 1000 rpm at a temperature of 25° C. for 12 hours to form the gel electrolyte precursor.

The proportions of the components of the liquid mixture A are as follows by mass fraction:
polyvinylidene chloride: 10%;
tetrahydrofuran: 70%; and
antioxidant 1010: 2%.

The proportions of the components of liquid mixture B are as follows by mass fraction:
lithium bistrifluoromethanesulfonylimide: 4%;
diethyl carbonate: 6%;
ethylene carbonate: 2%;
ethyl acetate: 1%;
Aluminum oxide: 2%;
vinylene carbonate: 1%; and
tributyl phosphate: 2%.

Furthermore, the activated infiltration solution of the cathode and the activated infiltration solution of the anode are formed. The activated infiltration solution of the cathode and the activated infiltration solution of the anode based on the following component proportions are respectively stirred at a rotational speed of 1000 rpm and at a temperature of 25° C. for 12 hours.

The proportions of the components of the activated infiltration solution of the cathode are as follows by mass fraction:
diethyl carbonate: 60%;
ethylene carbonate: 20%;
ethyl acetate: 10%;
surfactant (Dynol 607): 9%; and
vinylene carbonate: 1%.

The proportions of the components of the activated infiltration solution of the anode are as follows by mass fraction:
diethyl carbonate: 60%;
ethylene carbonate: 20%;
ethyl acetate: 10%;
surfactant (Dynol 607): 8%; and
dimethylsulfide: 2%.

Lithium cobalt oxide is employed as the cathode and graphite is employed as the anode. After the cathode and the anode are cut and dewatered in a high temperature, each cathode is placed into the corresponding activated infiltration solution of the cathode for cleaning and soaking for 30 seconds, and each anode is placed into the corresponding activated infiltration solution of the anode for cleaning and soaking for 30 seconds.

Then, a layer of electrolyte precursor having a thickness of 80 μm is homogenously coated on two opposite surfaces of the cleaned and infiltrated anode. The coating operation lasts for about 5 to 10 minutes at room temperature under atmospheric pressure and inert gas-protected condition, therefore, the gel electrolyte membrane with a thickness of 20 μm grows on the two surfaces of the anode in situ.

In Experiment 1, the gel electrolyte membrane has a good adhesion to the anode and a good compatibility with the anode.

After the above steps, the cathode and the anode coated with the gel electrolyte on both surfaces are alternately laminated to form a bare cell with the gel electrolyte membrane sandwiched between the cathode and the anode. After the bare cell is welded to the tabs of the cathode and anode, the bare cell with the tabs is placed into the shell-formed aluminum plastic film and is sealed, formed, shaped and degassed by a heat sealing machine, to form the gel polymer lithium-ion battery.

Experiment 2

The difference between Experiment 2 and Experiment 1 is that:

the electrolyte precursor and the activated infiltration solution are respectively formed in the presence of dry air. The proportions of the components of the liquid mixture A are as follows by mass fraction:
polyoxyethylene: 10%;
polyvinylidene chloride: 2%;
tetrahydrofuran: 60%;
N-methylpyrrolidone: 11%; and
antioxidant 1010: 0.2%; and
the proportions of the components of liquid mixture B are as follows by mass fraction:
lithium perchlorate: 5%;
lithium bistrifluoromethanesulfonylimide: 2%;
dimethyl carbonate: 2%;
ethylene carbonate: 3%;
ethyl acetate: 3.8%;
Aluminum oxide: 0.5%;
methylamine nitrite: 0.5%; and
difluoromethyl vinyl carbonate: 1%.

The activated infiltration solution of the cathode and the activated infiltration solution of the anode based on the following component proportions are respectively stirred at a rotational speed of 1000 rpm and at a temperature of 25° C. for 12 hours.

The proportions of the components of the activated infiltration solution of the cathode are as follows by mass fraction:
diethyl carbonate: 60%;
ethylene carbonate: 20%;
ethyl acetate: 10%;
surfactant (EnviroGem360): 8%; and
biphenyl: 2%.

The proportions of the components of the activated infiltration solution of the anode is as follows by mass fraction:
diethyl carbonate: 60%:
ethylene carbonate: 20%; ethyl acetate: 10%;
surfactant (EnviroGem360): 9%; and
vinylene carbonate: 1%.

The other steps and components are the same as those of Experiment 1.

Experiment 3

The difference between Experiment 3 and Experiment 1 is that:

The proportions of the components of the liquid mixture A are as follows by mass fraction:
polyoxyethylene: 10%;
polyvinylidene chloride: 2%;
tetrahydrofuran: 11%;
N-methylpyrrolidone: 60%; and
antioxidant 1010: 0.2%.

The proportions of the components of liquid mixture B are as follows by mass fraction:
lithium perchlorate: 4%;
lithium bistrifluoromethanesulfonylimide: 5%;
dimethyl carbonate: 2%;
ethylene carbonate: 1%;
ethyl acetate: 3.8%;
Aluminum oxide: 0.4%;
methylamine nitrite: 0.3%; and
difluoromethylvinyl carbonate: 0.3%.

The activated infiltration solution of the cathode and the activated infiltration solution of the anode based on the following component proportions are respectively stirred at a rotational speed of 1000 rpm and at a temperature of 25° C. for 12 hours.

The proportions of the components of the activated infiltration solution of the cathode are as follows by mass fraction:
diethyl carbonate: 60%;
ethylene carbonate: 20%;
ethyl acetate: 10%;
surfactant (EnviroGem360): 8%; and
biphenyl: 2%.

The proportions of the components of the activated infiltration solution of the anode are as follows by mass fraction:
diethyl carbonate: 60%;
ethylene carbonate: 20%;
ethyl acetate: 10%;
surfactant (EnviroGem360): 9%; and
vinylene carbonate: 1%.

After the infiltration and activation, the operation of coating the gel electrolyte membrane is performed, including: performing the coating operation at a temperature of 50° C. under atmospheric pressure and inert gas-protected condition, such that the gel electrolyte membrane with a thickness of 30 μm grows on two surfaces of the anode in situ.

Experiment 4

The difference between Experiment 4 and Experiment 1 is that:

The proportions of the components of the liquid mixture A forming the gel electrolyte precursor are as follows by mass fraction:
polyethylene: 9%;
polyvinyl chloride: 6%;
tetrahydrofuran: 66%; and
antioxidant 1010: 1%.

The proportions of other components and other steps are the same as those of Experiment 1.

Experiment 5

The difference between Experiment 5 and Experiment 1 is that:

The proportions of the components of the liquid mixture A forming the gel electrolyte precursor are as follows by mass fraction:
methyl methacrylate: 45%;
dimethylsulfoxide: 30%; and
antioxidant 3114: 7%.

The proportions of other components and other steps are the same as those of Experiment 1.

Experiment 6

The difference between Experiment 6 and Experiment 1 is that:

The proportions of the components of the liquid mixture A forming the gel electrolyte precursor are as follows by mass fraction:
  polyoxyethylene: 11%;
  polystyrene: 10%; and
  N-methylpyrrolidone: 61%.

The proportions of other components and other steps are the same as those of Experiment 1.

Experiment 7

The difference between Experiment 7 and Experiment 1 is that:

The proportions of the components of the liquid mixture B forming the gel electrolyte precursor are as follows by mass fraction:
  lithium bistrifluoromethanesulfonylimide: 9%;
  diethyl carbonate: 3%;
  ethylene carbonate: 2%;
  ethyl acetate: 2.1%;
  aluminum oxide: 0.8%;
  vinylene carbonate: 0.5%; and
  tributyl phosphate: 0.6%.

The proportions of other components and other steps are the same as those of Experiment 1.

Experiment 8

The difference between Experiment 8 and Experiment 1 is that:

The proportions of the components of the liquid mixture B forming the gel electrolyte precursor are as follows by mass fraction:
  lithium hexafluorophosphate: 7%;
  lithium tetrafluoroborate: 7%;
  diethyl carbonate: 1.2%;
  ethylene carbonate: 0.3%;
  ethyl acetate: 0.2%;
  aluminum oxide: 0.2%;
  vinylene carbonate: 0.1%; and
  tributyl phosphate: 2%.

The proportions of other components and other steps are the same as those of the experiment 1.

Experiment 9

The difference between the experiment 9 and experiment 1 is that:

The proportions of the components of the liquid mixture B forming the gel electrolyte precursor are as follows by mass fraction:
  lithium hexafluorophosphate: 6%;
  lithium tetrafluoroborate: 5%;
  lithium trifluoromethanesulfonate: 3% diethyl carbonate: 0.5%;
  ethylene carbonate: 0.5%;
  ethyl acetate: 1.6%;
  aluminum oxide: 0.4%;
  vinylene carbonate: 0.6%; and
  tributyl phosphate: 0.4%.

The proportion of other components and other steps are the same as those of the experiment 1.

Experiment 10

The difference between Experiment 10 and Experiment 1 is that:

The proportions of the components of the liquid mixture B forming the gel electrolyte precursor are as follows by mass fraction:
  lithium bistrifluoromethanesulfonylimide: 17.2%;
  diethyl carbonate: 0.2%;
  aluminum oxide: 0.2%;
  vinylene carbonate: 0.3%; and
  tributyl phosphate: 0.1%.

The proportion of other components and other steps are the same as those of the experiment 1.

Experiment 11

The difference between the experiment 11 and experiment 1 is that:

The proportions of the components of the liquid mixture B forming the gel electrolyte precursor are as follows by mass fraction:
  lithium bistrifluoromethanesulfonylimide: 9%;
  diethyl carbonate: 5%;
  ethylene carbonate: 1%;
  ethyl acetate: 1.3%;
  aluminum oxide: 0.7%;
  vinylene carbonate: 0.3%; and
  tributyl phosphate: 0.7%.

The proportion of other components and other steps are the same as those of the experiment 1.

Experiment 12

The difference between experiment 12 and Experiment 1 is that:

the cathode and the anode are not infiltrated and activated by the corresponding activated infiltration solutions of the cathode and that of the anode respectively. The proportions of other components and other steps are the same as those of Experiment 1.

Experiment 13

The difference between Experiment 13 and Experiment 1 is that:

The proportions of the components of the activated infiltration solution of the cathode are as follows by mass fraction:
  diethyl carbonate: 13%;
  ethylene carbonate: 16%;
  ethyl acetate: 3%;
  surfactant (Dynol 607): 50%; and
  vinylene carbonate: 12%.

The portions of other components and other steps are the same as those of Experiment 1.

Experiment 14

The difference between Experiment 14 and Experiment 1 is that:

The proportions of the components of the activated infiltration solution of the cathode are as follows by mass fraction:

ethyl acetate: 57%;
surfactant (Dynol 607): 30%; and
vinylene carbonate: 13%.

The portions of other components and other steps are the same as those of Experiment 1.

Experiment 15

The difference between Experiment 14 and Experiment 1 is that:

The proportions of the components of the activated infiltration solution of the cathode are as follows by mass fraction:
ethyl acetate: 48%;
fatty alcohol polyoxyethylenether: 40%; and
vinylene carbonate: 12%.

The proportions of other components and other steps are the same as those of Experiment 1.

Experiment 16

The difference between Experiment 16 and Experiment 1 is that:

The proportions of the components of the activated infiltration solution of the cathode are as follows by mass fraction:
diethyl carbonate: 60%;
ethylene carbonate: 20%;
ethyl acetate: 10%;
surfactant (Dynol 607): 8%; and
thiophene: 2%.

The proportions of other components and other steps are the same as those of Experiment 1.

Experiment 17

The difference between Experiment 17 and Experiment 1 is that:

The proportions of the components of the activated infiltration solution of the cathode are as follows by mass fraction:
diethyl carbonate: 31%;
ethylene carbonate: 27%;
ethyl acetate: 14%;
surfactant (Dynol 607): 9%; and
vinyl acetate: 19%.

The proportions of other components and other steps are the same as those of Experiment 1.

Experiment 18

The difference between Experiment 18 and Experiment 1 is that:

The proportions of the components of the activated infiltration solution of the cathode are as follows by mass fraction:
diethyl carbonate: 31%;
ethylene carbonate: 27%;
ethyl acetate: 14%;
surfactant (Dynol 607): 17%; and
vinyl acetate: 1%.

The proportions of other components and other steps are the same as those of Experiment 1.

Experiment 19

The difference between Experiment 19 and Experiment 1 is that:

The proportions of the components of the activated infiltration solution of the anode are as follows by mass fraction:
diethyl carbonate: 40%;
ethylene carbonate: 40%;
ethyl acetate: 10%;
surfactant (Dynol 607): 8%; and
dimethylsulfide: 2%.

The proportions of other components and other steps are the same as those of Experiment 1.

Experiment 20

The difference between Experiment 20 and Experiment 1 is that:

The proportions of the components of the activated infiltration solution of the anode are as follows by mass fraction:
dimethyl carbonate: 60%;
ethylene carbonate: 20%;
ethyl acetate: 10%;
wetting agent (EnviroGem360): 9%; and
vinylene carbonate: 1%.

The proportions of other components and other steps are the same as those of Experiment 1.

Experiment 21

The difference between Experiment 21 and Experiment 1 is that:

the process of forming the gel electrolyte precursor is performed at a temperature of −10° C., and the mixture is stirred at a rotational speed of 1000 rpm for 96 hours to form the gel electrolyte precursor after homogenously mixed.

Other component proportions and other steps are as the same as those of Experiment 1.

Experiment 22

The difference between Experiment 22 and Experiment 1 is that:

the process of forming of the gel electrolyte precursor is performed at a temperature of 10° C., and the mixture is stirred at a rotational speed of 1000 rpm for 48 hours to form the gel electrolyte precursor after homogenously mixed.

The proportions of other components and other steps are as the same as those of Experiment 1.

Experiment 23

The difference between Experiment 23 and Experiment 1 is that:

the coating operation is performed on the cleaned and infiltrated anode at a temperature of −10° C. for 10 minutes, such that a layer of gel electrolyte membrane with a thickness of 10 μm grows on two surfaces of the anode in situ.

The proportions of other components and other steps are as the same as those of Experiment 1.

Experiment 24

The difference between Experiment 24 and Experiment 1 is that:

the coating operation is performed on the cleaned and infiltrated anode at a temperature of −10° C. for 8 minutes, such that a layer of gel electrolyte membrane with a thickness of 26 μm grows on two surfaces of the anode in situ.

The proportions of other components and other steps are as the same as those of Experiment 1.

In order to verify the technical effect of the gel electrolyte polymer lithium-ion battery and the method for forming the same, following comparative groups are provided for comparing with Experiments 1 to 24.

Comparative Experiment 1

The difference between Comparative experiment 1 and Experiment 1 is that:
the gel electrolyte membrane is replaced by liquid electrolyte. The liquid electrolyte are mixed by the following components by mass fraction:
lithium bistrifluoromethanesulfonylimide: 18%;
diethyl carbonate: 8%;
ethylene carbonate: 5%;
ethyl acetate: 5%;
aluminum oxide: 1%;
vinylene carbonate: 2%;
tributyl phosphate: 1%; and tetrahydrofuran 60%.

The proportions of other components and other steps are as the same as those of Experiment 1.

Comparative Experiment 2

The difference between Comparative experiment 2 and Experiment 1 is that, the gel electrolyte and the gel electrolyte battery cell are formed by the following steps:

(1) preparing the liquid electrolyte: mixing the following components including ethylene carbonate, diethyl carbonate, ethyl carbonate, and vinylene carbonate in a mass ratio of 30:40:30:1, adding lithium hexafluorophosphate to the mixture to obtain the liquid electrolyte having a concentration of the lithium hexafluorophosphate of 1 mol/L;

(2) preparing the gel electrolyte: mixing the following components including the above liquid electrolyte, polyvinylidene fluoride, ethyl acrylate, pentaerythritol acrylate propoxylate, and benzoyl peroxydicarbonate in a mass ratio of 99.979:0.05:0.05:0.1:0.001, and stirring the mixture to obtain the gel electrolyte; and (3) preparing the gel electrolyte cell: employing graphite as the cathode and employing lithium cobalt oxide as the anode of, and winding the anode and the cathode to obtain a bare cell; and injecting the above gel electrolyte into the bare cell to form the desired gel electrolyte cell.

After the gel electrolyte cell is obtained, a gel electrolyte lithium-ion battery is further formed by the gel electrolyte cell.

Comparative Experiment 3

The difference between Comparative experiment 3 and Experiment 1 is that:
The proportions of the components of the liquid mixture A forming the gel electrolyte precursor are as follows by mass fraction:
methyl methacrylate: 62%;
dimethylsulfoxide: 15%; and
antioxidant 3114: 5%.

Methyl methacrylate is a polymer matrix, dimethyl sulfoxide is an organic solvent, and antioxidant 3114 is an antioxidant.

The proportions of other components and other steps are as the same as those of Experiment 1.

Comparative Experiment 4

The difference between Comparative experiment 3 and Experiment 1 is that:
The proportions of the components of the liquid mixture A forming the gel electrolyte precursor are as follows by mass fraction:
polystyrene: 71%; and
tetrahydrofuran: 11%.

The polystyrene is a polymer matrix, tetrahydrofuran is an organic solvent.

The proportions of other components and other steps are as the same as those of Experiment 1.

Further performance tests were performed on the above-mentioned experiments 1 to 24 and comparative experiments 1 to 4.

Electrolyte Conductivity Test

Experimental subjects: gel electrolyte membrane obtained in Experiments 1 to 24 and electrolytes formed in Comparative experiments 1 to 4;

Experimental method: forming a symmetrical blocked analog battery according to the structure of SS (stainless steel)|PE (gel electrolyte)|SS (stainless steel); testing the analog battery by a Princeton electrochemical workstation at a temperature of 25° C. at a frequency of 1 to 100000 Hz, and recording different conductivities obtained in the tests at different frequencies.

Figure 1:
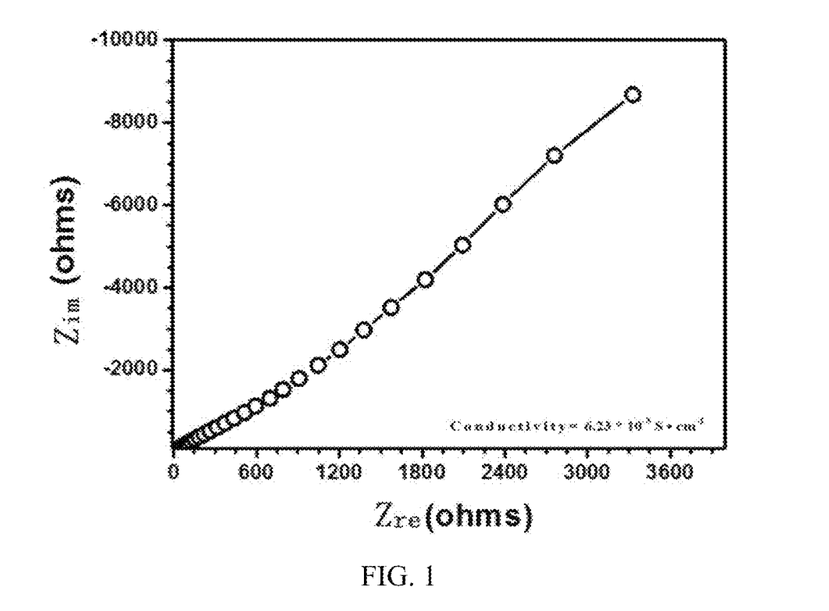
FIG. 1 is an EIS plot of an SS|PE|SS blocked analog battery formed by a gel electrolyte membrane in accordance with an embodiment of the present disclosure.

Experimental results: the AC resistance spectrum of the gel electrolyte membrane is shown in FIG. 1, wherein the abscissa Zre represents the real part of the resistance and the ordinate Zim represents the imaginary part of the resistance.

The conductivities of the electrolytes obtained in Experiments 1 to 24 and Comparative experiments 1 to 4 are tested according to the above method. The results are as shown in the following Table 1.

TABLE 1

The conductivities obtained in Experiments 1 to 24 and Comparative experiments 1 to 4

| Subject | Conductivity (S · cm$^{-1}$) |
|---|---|
| Experiment 1 | $6.23 * 10^{-3}$ |
| Experiment 2 | $5.6 * 10^{-3}$ |
| Experiment 3 | $4.8 * 10^{-3}$ |
| Experiment 4 | $6.1 * 10^{-3}$ |
| Experiment 5 | $5.3 * 10^{-3}$ |
| Experiment 6 | $6.2 * 10^{-3}$ |
| Experiment 7 | $4.7 * 10^{-3}$ |
| Experiment 8 | $5.1 * 10^{-3}$ |
| Experiment 9 | $3.9 * 10^{-3}$ |
| Experiment 10 | $3.8 * 10^{-3}$ |
| Experiment 11 | $4.1 * 10^{-3}$ |
| Experiment 12 | $4.3 * 10^{-3}$ |
| Experiment 13 | $4.1 * 10^{-3}$ |
| Experiment 14 | $4.6 * 10^{-3}$ |
| Experiment 15 | $4.5 * 10^{-3}$ |
| Experiment 16 | $3.6 * 10^{-3}$ |
| Experiment 17 | $3.7 * 10^{-3}$ |
| Experiment 18 | $3.9 * 10^{-3}$ |
| Experiment 19 | $5.8 * 10^{-3}$ |
| Experiment 20 | $4.1 * 10^{-3}$ |
| Experiment 21 | $4.2 * 10^{-3}$ |
| Experiment 22 | $3.4 * 10^{-3}$ |
| Experiment 23 | $3.8 * 10^{-3}$ |
| Experiment 24 | $6.3 * 10^{-3}$ |
| Comparative experiment 1 | $8.21 * 10^{-3}$ |

TABLE 1-continued

The conductivities obtained in Experiments
1 to 24 and Comparative experiments 1 to 4

| Subject | Conductivity (S · cm$^{-1}$) |
|---|---|
| Comparative experiment 2 | 2.1 * 10$^{-3}$ |
| Comparative experiment 3 | 3.1 * 10$^{-3}$ |
| Comparative experiment 4 | 2.12 * 10$^{-3}$ |

As can be seen from Table 1, the gel electrolyte membranes obtained in Experiments 1 to 24 have a relatively high conductivity ranged from 3.4 to 6.3*10-3 S·cm-1.

Electrochemical Window Test of Gel Electrolyte Membrane

Experimental subjects: the gel electrolyte membrane formed in Experiments 1 to 2.

Experimental method: forming an asymmetric coin cell according to the structure of Li (metal lithium)|PE (gel electrolyte)|SS (stainless steel), wherein Li is the auxiliary electrode and reference electrode and SS is the working electrode; testing the gel electrolyte membrane by a Princeton electrochemical workstation in a RT of 25° C. at a scanning rate of 5 mV/s; and recording the obtained electrochemical window to obtain a linear voltammetry graph.

Figure 2:
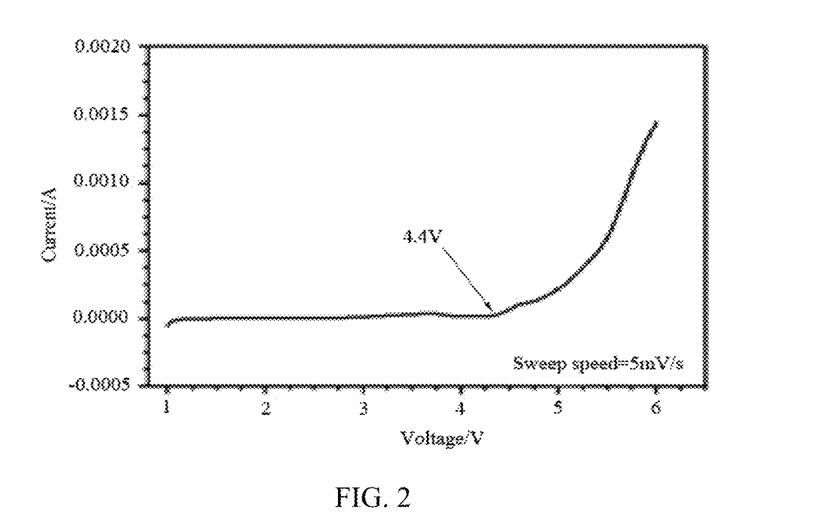
FIG. 2 is a linear voltammetric curve of the gel electrolyte membrane of Experiment 1 in accordance with one embodiment of the present disclosure.
Figure 3:
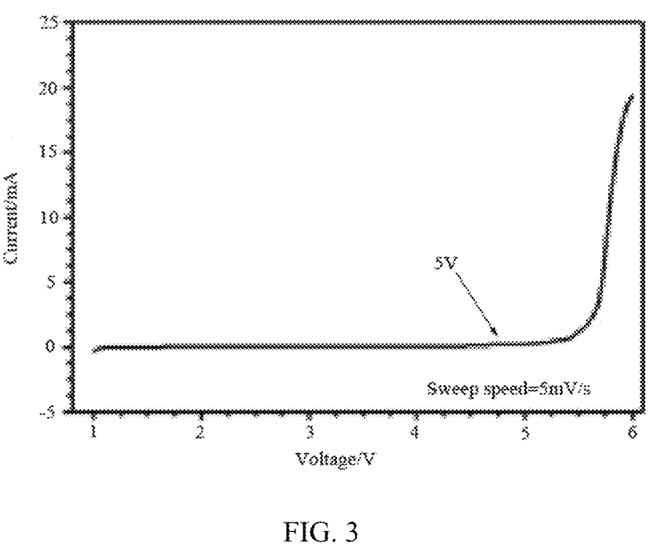
FIG. 3 is a linear voltammetric curve of the gel electrolyte membrane of Experiment 2 in accordance with another embodiment of the present disclosure.

Experimental results: the linear voltammetry graph of the gel electrolyte membrane obtained in Experiment 1 is as shown in FIG. 2, and the linear voltammetry graph of the gel electrolyte membrane obtained in Experiment 2 is as shown in FIG. 3.

Analysis of the experimental results: as can be seen from FIGS. 2 and 3, the electrochemical window of the gel electrolyte membrane obtained in Experiment 1 is greater than 4.4V; and the electrochemical window of the gel electrolyte membrane obtained in Experiment 2 is greater than 5V. That is to say, the electrochemical windows of the gel electrolyte membranes obtained in both Experiments 1 and 2 are relatively wide.

Micro-Morphology Detection of Gel Electrolyte Membrane

Experimental subject: the gel electrolyte membrane obtained in Experiment 1.

Experimental method: the micro-morphology of the gel electrolyte membrane obtained in Experiment 1 is detected.

Figure 4:
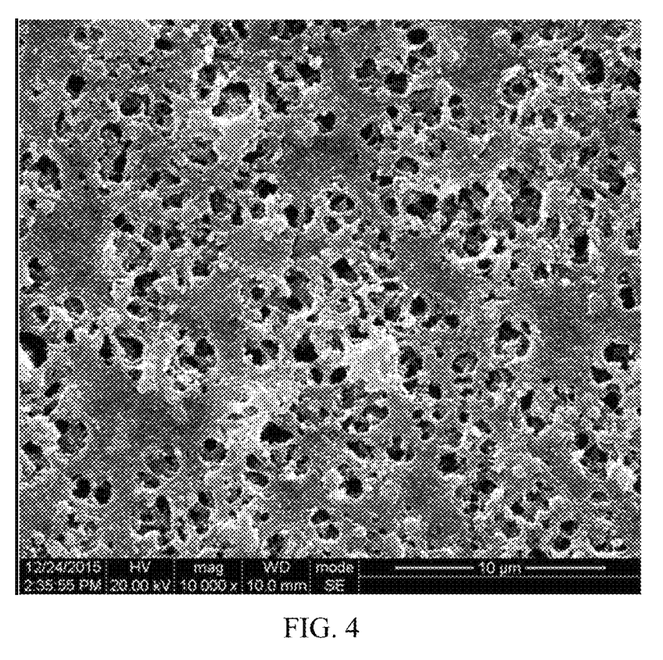
FIG. 4 is an image of micromorphology of the gel electrolyte membrane of Experiment 1 in accordance with the embodiment of the present disclosure.

Experimental results and analysis thereof: as shown in FIG. 4, the gel electrolyte membrane obtained in Experiment 1 has a porous mesh structure with a pore size of 50 nm to 2 μm.

In order to compare the cycle performance of the gel polymer lithium-ion battery obtained in the present disclosure with those of the lithium-ion battery obtained in Comparative experiments 1 to 4, following tests of cell capacity retention and coulomb efficiency of the battery are carried out.

Capacity Retention Test of Lithium-Ion Battery

Experimental subjects: Experiments 1 to 24 and comparative experiments 1 to 4.

Experimental method: 1) charging the battery with a constant 0.2 C current until the voltage reaches 4.2V; 2) charging the battery at a constant voltage of 4.2V until the current reaches 0.05 C; 3) discharging the batteries with a constant current 0.2 C until the voltage reaches 3V; repeating the above steps 1) to 3), and recording the number of cycles and the corresponding capacity retention rates.

Figure 5:
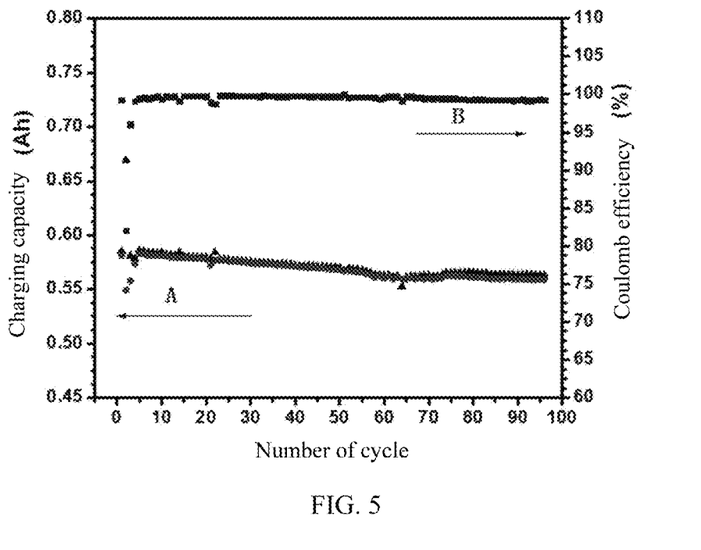
FIG. 5 is a schematic view of a cycle performance of a gel polymer lithium-ion battery of Experiment 1 in accordance with the embodiment of the present disclosure.

Experimental results: the cycle performance of the gel polymer lithium-ion battery of Experiment 1 is shown by the curve A in FIG. 5. The capacity retention rates of the lithium-ion batteries obtained in Experiments 1 to 24 and Comparative experiments 1 to 4 are as shown in Table 2.

TABLE 2 capacity retention rates of the lithium-ion batteries obtained
in Experiments 1 to 24 and Comparative experiments 1 to 4

| Experimental subject | Capacity retention rate |
|---|---|
| Experiment 1 | 95.6% |
| Experiment 2 | 94.7% |
| Experiment 3 | 94.1% |
| Experiment 4 | 93.8% |
| Experiment 5 | 93.6% |
| Experiment 6 | 94.2% |
| Experiment 7 | 95.1% |
| Experiment 8 | 93.6% |
| Experiment 9 | 93.8% |
| Experiment 10 | 94.2% |
| Experiment 11 | 93.8% |
| Experiment 12 | 93.6% |
| Experiment 13 | 94.2% |
| Experiment 14 | 92.1% |
| Experiment 15 | 91.6% |
| Experiment 16 | 92.8% |
| Experiment 17 | 93.2% |
| Experiment 18 | 91.9% |
| Experiment 19 | 92.6% |
| Experiment 20 | 91.8% |
| Experiment 21 | 92.2% |
| Experiment 22 | 93.6% |
| Experiment 23 | 94.1% |
| Experiment 24 | 93.6% |
| Comparative experiment 1 | 50% |
| Comparative experiment 2 | 72% |
| Comparative experiment 3 | 61% |
| Comparative experiment 4 | 58% |

Analysis of results: as can be seen from FIG. 5, the curve A points shows the changing of the charging capacity as the number of charging-discharging cycle increases. As can be seen from the curve A that the charging capacity of the gel polymer lithium-ion battery substantially remains unchanged when the number of cycles are 10 and 100, and the capacity retention rate thereof can reach 95.6%.

As can be seen from Table 2, it is clear that the capacity retention rates of the gel polymer lithium-ion batteries obtained in Experiments 1 to 24 are better than those of the lithium-ion batteries obtained in comparative experiments 1 to 4.

First-Week Coulomb Efficiency Test of Gel Polymer Lithium-Ion Battery

Experimental subject: Experiments 1 to 3.

Experimental method: charging the batteries and recording the charging capacities, discharging the batteries and recording the discharging capacities, calculating the first-week coulomb efficiencies of the batteries based on the recorded charging capacities and the discharging capacities according to the calculating formula of the coulomb efficiency:

$$\text{coulomb efficiency} = \text{first-week charging capacity} / \text{first-week discharging capacity} * 100\%.$$

Experimental results and analysis: the first-week coulomb efficiency of the gel polymer lithium-ion battery obtained in Experiment 1 is greater than 95%; as shown by the curve B in FIG. 5. The coulomb efficiency of the gel polymer lithium-ion battery obtained in Experiment 1 remains at about 99% with little fluctuation as the number of cycles increases.

The first-week coulomb efficiency of the gel polymer lithium-ion battery obtained in Experiment 2 is greater than 80%.

The first-week coulomb efficiency of the gel polymer lithium-ion battery obtained in Experiment 3 is greater than 90%.

Electrochemical Performance Test after Damage of Lithium-Ion Battery

Experimental subjects: Experiments 1 to 24 and Comparative experiments 1 to 4;

Experimental method: fully charging the batteries and cutting the batteries from the middle thereof by scissors, and observing and recording the states of the batteries; and connecting a small fan to the cut batteries respectively and observing the working states of the small fan.

Experimental results: results of the tests are as shown in Table 3.

TABLE 3 electrochemical performance tests after damage of the lithium-ion batteries obtained in Experiments 1 to 24 and Comparative experiments 1 to 4:

| Experimental subjects | Ignition | Smoke | Liquid flowed out | Rotation of small fan |
| --- | --- | --- | --- | --- |
| Experiment 1 | No | No | No | Yes |
| Experiment 2 | No | No | No | Yes |
| Experiment 3 | No | No | No | Yes |
| Experiment 4 | No | No | No | Yes |
| Experiment 5 | No | No | No | Yes |
| Experiment 6 | No | No | No | Yes |
| Experiment 7 | No | No | No | Yes |
| Experiment 8 | No | No | No | Yes |
| Experiment 9 | No | No | No | Yes |
| Experiment 10 | No | No | No | Yes |
| Experiment 11 | No | No | No | Yes |
| Experiment 12 | No | No | No | Yes |
| Experiment 13 | No | No | No | Yes |
| Experiment 14 | No | No | No | Yes |
| Experiment 15 | No | No | No | Yes |
| Experiment 16 | No | No | No | Yes |
| Experiment 17 | No | No | No | Yes |
| Experiment 18 | No | No | No | Yes |
| Experiment 19 | No | No | No | Yes |
| Experiment 20 | No | No | No | Yes |
| Experiment 21 | No | No | No | Yes |
| Experiment 22 | No | No | No | Yes |
| Experiment 23 | No | No | No | Yes |
| Experiment 24 | No | No | No | Yes |
| Comparative experiment 1 | Yes | Yes | Yes | No |
| Comparative experiment 2 | Yes | Yes | No | No |
| Comparative experiment 3 | No | No | No | No |
| Comparative experiment 4 | No | No | No | No |

Analysis of the experimental results are as follows.

As can be seen from Table 3, in Experiments 1 to 24 provided by the present disclosure, after the gel polymer lithium-ion battery is cut from the middle thereof, the battery neither ignites nor smokes, and no liquid flows out of the battery, thus, the battery has a higher safety. In addition, when the cut battery is connected to the small fan, the small fan can continue to work.

In Comparative experiments 1 to 2, after the lithium-ion battery is cut from the middle thereof, the battery ignites and smokes, and cannot continue to work. In addition, in Comparative experiment 1, there is further liquid leakage out of the battery, which brings great safety risks in the use of the battery; while in Comparative experiment 3 to 4, although the damaged battery neither ignites nor smokes and no liquid flows out of the battery, the damaged battery cannot continue to work, thus, the lithium-ion battery obtained in Comparative experiment 3 to 4 is inferior in the performance.

Compared with the prior art, the gel electrolyte membrane and the method for forming the same, the gel polymer lithium-ion battery and the method for forming the same, and the electric vehicle provided in the present disclosure have technical effects as follows.

In the method for forming the gel electrolyte membrane provided in the present disclosure, the gel electrolyte precursor formed by the liquid mixture A and the liquid mixture B is used to form the gel electrolyte membrane on at least one surface of the electrode. The liquid mixture A includes the polymer matrix and the organic solvent, and the liquid mixture B includes the lithium salt, the plasticizer, and the additive. It is easy to obtain the gel electrolyte membrane with a desired porous mesh structure by growing on the electrode in situ using the gel electrolyte precursor formed by mixing the liquid mixture A and the liquid mixture B.

In the present disclosure, the components of the liquid mixture A and the liquid mixture B are further limited. Thus, the environmental requirements are relatively lower for performing the process of forming the gel electrolyte membrane using the formulation of the gel electrolyte membrane provided in the present disclosure. Such as, the process can be performed in air or under inert gas-protected condition. The reaction temperature range is relatively wide (−40 to 120° C.). The thickness of the gel electrolyte ranging from 1 to 200 µm can be designed according to the requirements, and the process of forming the gel electrolyte is simple and suitable for industrial production.

In the above described steps for forming the gel electrolyte precursor provided in the present disclosure, such as the liquid mixture A and the liquid mixture B are respectively pre-stirred for 0.5 to 96 hours at a temperature of −10 to 30° C., and the pre-stirred liquid mixture A and liquid mixture B are mixed and stirred for 0.5 to 96 hours et al. It is easy to homogenously mix the liquid mixture A and the liquid mixture B and to facilitate the obtained gel electrolyte precursor to homogenously grow on the surface of the electrode.

In the method for forming the gel electrolyte membrane provided in the present disclosure, the step of infiltrating and activating the surface of the electrode is further included. By the above method, the impurities on the surface of the electrode are effectively removed and the surface of the electrode can be activated, so that the gel electrolyte precursor can homogenously grow on the surface of the electrode more to allow for a better interfacial compatibility between the gel electrolyte membrane and the electrode, thereby reducing the interfacial resistance.

The polymer matrix, the organic solvent and the lithium salt employed in the present invention are all beneficial for the gel electrolyte precursor homogenously growing in situ on the surface of the electrode and forming the gel electrolyte membrane with a porous mesh structure.

The gel electrolyte membrane provided in the present disclosure is formed on at least one surface of the electrode and has a porous mesh structure containing a high level of residence liquid. Thus, the gel electrolyte membrane has a better interfacial compatibility and a small interfacial resistance with the electrode (such as the anode), and the gel electrolyte membrane obtained by in-situ growth has a high level of residence liquid, a high conductivity (3 to 9*10-3 S·cm-1), a wide electrochemical window (greater than 4.4V), a good cycle performance, and a good rate performance.

With the gel electrolyte membrane and the method for forming the same provided in the present disclosure, the gel electrolyte membrane can homogenously grow on both sides of the provided anode, thereby improving the cycle performance of the lithium-ion battery including the gel electrolyte membrane and thus the battery can have batter electrochemical performance. With the structure and the surfactant provided in the present disclosure, the infiltration of the anode is improved to allow for a good connection between the gel electrolyte membrane and the anode, thereby facilitating the gel electrolyte membrane to homogenously grow on the anode.

The gel polymer lithium-ion battery formed by the method provided in the present disclosure has a better cycle performance, and the capacity retention rate can reach over 80% after 500 times of charging and discharging at a constant current of 0.2 C.

The technological process of winding diaphragm and pouring liquid of the traditional lithium ion battery is omitted in the forming process of the gel polymer lithium-ion battery formed by the method provided in the present disclosure, which can save cost and improve production efficiency. The obtained gel polymer lithium-ion battery has good safety; even if the package of the battery is broken, the battery can continue to work without safety problems such as leakage of liquid, ignition, and even explosion.

The electric vehicle provided in the present disclosure includes the gel electrolyte membrane as described above; and the gel polymer lithium-ion battery having the gel electrolyte membrane has a good machinability and can be designed according to specific purposes. In addition, due to simple technique, low cost of raw materials, low requirements for production environment, and low cost, the battery can be used for mass production of industrial products. Furthermore, the electric vehicle provided by the present disclosure has good safety and long service life.

It is to be understood, however, that even though numerous characteristics and advantages of the present disclosure have been set forth in the foregoing description, together with details of the structure and function of the disclosure, the disclosure is illustrative only, and arrangement may be made in detail, especially in matters of shape, size, and arrangement of parts within the principles of the invention to the full extent indicted by the broad general meaning of the terms in which the appended claims are expressed.

What is claimed is:

1. A method for forming a gel electrolyte membrane, comprising:
    providing a cathode and/or an anode;
    forming a gel electrolyte precursor; and
    forming the gel electrolyte membrane on at least one surface of the electrode by the gel electrolyte precursor through growing in situ;
    wherein the gel electrolyte precursor comprises a liquid mixture A and a liquid mixture B, the liquid mixture A comprising a polymer matrix and an organic solvent, and the liquid mixture B comprising a lithium salt, a plasticizer, and an additive;
    wherein the gel electrolyte precursor is formed by the following steps:
    pre-stirred the liquid mixture A and the liquid mixture B respectively at a speed of 100 to 5000 rpm and at a temperature of −10 to 30° C. for 0.5 to 96 h until the liquid mixture A and the liquid mixture B are respectively dissolved; and
    mixing the dissolved liquid mixture A and liquid mixture B and stirring at a speed of 100 to 5000 rpm and at a temperature of −10 to 30° C. for 0.5 to 96 h until the mixture of the liquid mixture A and the liquid mixture B are homogenously dispersed.

2. The method of claim 1, wherein the liquid mixture A comprises 1 to 60% by mass fraction of the polymer matrix and 20 to 90% by mass fraction of the organic solvent, and the liquid mixture B comprises 1 to 50% by mass fraction of the lithium salt, 1 to 60% by mass fraction of the plasticizer, and 1 to 50% by mass fraction of the additive.

3. The method of claim 2: wherein the liquid mixture A comprises 1 to 20% by mass fraction of the polymer matrix and 50 to 90% by mass fraction of the organic solvent, and the liquid mixture B comprises 1 to 20% by mass fraction of the lithium salt, 1 to 20% by mass fraction of the plasticizer, and 1 to 10% by mass fraction of the additive.

4. The method of claim 1, wherein the polymer matrix comprises one or more materials selected from the groups of:
    polyvinyl chloride, chlorinated polyvinyl chloride, polystyrene, polyoxyethylene, polymethylmethacrylate, polyvinylidene fluoride, polyacrylonitrile, vinylidene fluoride-hexafluoropropylene copolymer, polyethylene, methacrylic acid methyl acrylate, and thermoplastic acrylic resin;
    the organic solvent comprises one or more materials selected from the groups of: acetone, N-methylpyrrolidone, anhydrous ethanol, dimethyl sulfoxide, dimethylformamide, tetrahydrofuran and ethyl acetate;
    the lithium salt comprises one or more materials selected form the groups of: lithium hexafluorophosphate, lithium perchlorate, lithium hexafluoroarsenate, lithium tetrafluoroborate, lithium tetrachloroaluminate, lithium bistrifluoromethanesulfonimide, lithium trifluoromethanesulfonate, lithium dihydrogen oxalate, lithium chlorinated tetrafluoroborate, lithium difluoroborate oxalate, lithium perfluoromethanesulfonate, lithium fluoride, lithium carbonate, and lithium chloride;
    the plasticizer comprises one or more materials selected from the following groups of: propylene carbonate, ethylene carbonate, 1, 4-butyrolactone (γ-BL), diethyl carbonate, carbonic acid dimethyl carbonate, methyl ethyl carbonate, methyl propyl carbonate, and ethyl acetate; and the additives comprises one or more materials from the groups of inorganic nanoparticles, a flame retardant, a film former, an anti-overcharge additive, a surfactant, a phase separation solution.

5. The method of claim 1, wherein the gel electrolyte membrane is formed on the surface of the cathode and/or the anode by coating the gel electrolyte precursor on the surface of the cathode and/or the anode under inert gas-protected condition or in the presence of dry air at a temperature of −10 to 30° C. under a pressure of −0.9 to 1 Mpa for a certain time thereby growing the gel electrolyte membrane in situ on the surface of the cathode and/or the anode.

6. The method of claim 1, wherein before the step of forming the gel electrolyte membrane on at least one surface of the electrode by the gel electrolyte precursor, the method further comprises: preparing an activated infiltration solution of the cathode and/or the anode, and infiltrating and activating the cathode and/or the anode by the corresponding activated infiltration solution for 1 s to 2 h.

7. The method of claim 6, wherein the activated infiltration solution comprises 0.001 to 60% by mass fraction of surfactant, 0.001 to 20% by mass fraction of film former, and 1 to 90% by mass fraction of plasticizer.

8. The method of claim 7, wherein the surfactant comprises one or more materials selected from the groups of fluorosurfactant (FS-3100), wetting agent (Dynol 607), wetting agent (Dynol 980), wetting agent (EnviroGem360), carboxymethyl cellulose sodium salt (CMC-Na), sulfuric acid ester salts (such as acrylonitrile-EPDM rubber-styrene copolymer (AES) surfactants, sodium sulfate, fatty alcohol polyoxyethylene ether (AEO-9)), coconut fatty acid diethanolamide, polyether modified polydimethylsiloxane, alkylphenolethoxylates (OP-10), 1-dodecylazepan-2-ketone, and various fluorine-containing surfactants; and the film former comprises one or a mixture of several materials selected from the groups of sulfur dioxide ($SO_2$), carbon dioxide ($CO_2$), carbon monoxide (CO), carbon disulfide ($CS_2$), sulfurous acid esters (ES, PS, DMS, DES), anisole, vinylene carbonate (VC), tetrachlorethylene (TCE), acrylonitrile, vinyl acetate (VA), ethylenedioxythiophene, biphenyl, o-terphenyl, m-terphenyl, fluoroethylene carbonate, DMSM, lithium carbonate ($Li_2CO_3$), lithium oxide ($Li_2O$), sodium perchlorate ($NaClO_4$), potassium carbonate ($K_2CO_3$), silver hexafluorophosphate ($AgPF_6$), copper trifluoroacetate (CuTF), calcium trifluoromethanesulfonate $Ca(TFSA)_2$, sodium chloride (NaCl), lithium trimethylsilane borate, and lithium silicate ($Li_2SiO_3$).

\* \* \* \* \*